(12) United States Patent
Walsh et al.

(10) Patent No.: US 6,968,698 B2
(45) Date of Patent: Nov. 29, 2005

(54) GAS TURBINE ENGINE

(75) Inventors: Philip P. Walsh, Solihull (GB); Paul Fletcher, Rugby (GB)

(73) Assignee: Rolls-Royce plc, London (GB)

( * ) Notice: Subject to any disclaimer, the term of this patent is extended or adjusted under 35 U.S.C. 154(b) by 225 days.

(21) Appl. No.: 10/438,056

(22) Filed: May 15, 2003

(65) Prior Publication Data

US 2004/0025513 A1 Feb. 12, 2004

(30) Foreign Application Priority Data

May 16, 2002 (GB) .................................. 0211350

(51) Int. Cl.[7] .............................................. F02C 3/30
(52) U.S. Cl. ...................... 60/775; 60/39.3; 60/39.53
(58) Field of Search ........................... 60/39.3, 39.53, 60/39.55, 39.54, 39.58, 39.59, 775

(56) References Cited

U.S. PATENT DOCUMENTS

| | | | |
|---|---|---|---|
| 3,021,673 A * | 2/1962 | Mock ......................... | 60/39.3 |
| 4,522,024 A | 6/1985 | Zaugg | |
| 4,660,376 A * | 4/1987 | Johnson ....................... | 60/775 |
| 4,667,467 A | 5/1987 | Archer et al. | |
| 4,773,846 A | 9/1988 | Munk | |
| 5,121,596 A * | 6/1992 | Takehara et al. .............. | 60/775 |
| 6,089,011 A | 7/2000 | Shouman | |
| 6,216,443 B1 | 4/2001 | Utamura | |
| 6,484,508 B2 * | 11/2002 | Rocklin et al. ............... | 60/775 |
| 2001/0020360 A1 | 9/2001 | Tsukamoto | |
| 2001/0039794 A1 | 11/2001 | Rocklin | |
| 2002/0023425 A1 | 2/2002 | Blatter | |

FOREIGN PATENT DOCUMENTS

| | | |
|---|---|---|
| EP | EU 770771 A | 10/1999 |
| EP | 1 362 984 A | 11/2003 |
| WO | WO 01625 A | 2/1990 |
| WO | PCT/US99/16680 A | 2/2000 |

* cited by examiner

Primary Examiner—Louis J. Casaregola
(74) Attorney, Agent, or Firm—W. Warren Taltavull; Manelli Denison & Selter PLLC

(57) ABSTRACT

A gas turbine engine (10) comprises a second compressor (14), a first compressor (16), a heat exchanger (18), a combustor (20), a first turbine (22), a second turbine (24) and a third turbine (26) arranged in flow series. The first turbine (22) is arranged to drive the first compressor (16). The second turbine (24) is arranged to drive the second compressor (14). There are means to inject liquid into the gas turbine engine (10). The means to inject liquid is arranged to inject liquid upstream (46) of the second compressor (14), within (48) the second compressor (14), between (50) the second compressor (14) and the first compressor (16), within (52) the first compressor (16), between (54) the first compressor (16) and the heat exchanger (18) or within (56) the combustor (20) to boost the power of the gas turbine engine (10). The means to inject liquid is arranged to inject liquid between (70) the combustor (20) and the first turbine (22), within (68) the first turbine (22), between (66) the first turbine (22) and the second turbine (24), within (64) the second turbine (24), between (62) the second turbine (24) and the third turbine (26), within (60) the third turbine (26) or between (72) the third turbine (26) and the heat exchanger (18) to reduce the power of the gas turbine engine (10).

12 Claims, 1 Drawing Sheet

GAS TURBINE ENGINE

FIELD OF THE INVENTION

The present invention relates to a gas turbine engine and in particular to gas turbine engines for non-aero applications, although it may be applicable to gas turbine engine for aero applications. The present invention relates to turbofan, turbojet, turboprop and turboshaft gas turbine engines.

BACKGROUND OF THE INVENTION

Gas turbine engines of all types experiences changes in power levels. Normally, these changes in power level involve acceleration, or deceleration, of each turbine and associated compressor. These changes in power level take a finite amount of time. The time is determined by the inertia of each turbine and associated compressor and by limitations on the change in fuel flow rate allowed to avoid compressor surge, over temperature or extinction of combustion in the combustor.

In industrial gas turbine engines very fast reductions in power level are required if there is a loss of load, an emergency shut down or a shaft breakage. If the gas turbine engine includes a heat exchanger to transfer heat from the exhaust gases to the air entering the combustor, the heat transferred by the heat exchanger to the air entering the combustor cannot be turned off easily.

Recuperated gas turbine engines use heat exchangers to return heat from the final turbine exhaust to pre-heat compressed air entering the combustor. This helps to conserve fuel by raising the combustor air temperature and therefore limiting the amount of fuel needed to achieve the turbine inlet temperature.

SUMMARY OF THE INVENTION

Accordingly the present invention seeks to provide a novel gas turbine engine, which reduces, preferably overcomes, the above-mentioned problems.

Accordingly the present invention provides a gas turbine engine comprising at least one compressor, a combustor and at least one turbine arranged in flow series, the at least one turbine being arranged to drive the at least one compressor, means to inject cooling liquid into the gas turbine engine while the gas turbine engine is accelerating, the means to inject cooling liquid being arranged to inject cooling liquid upstream of the at least one compressor, within the at least one compressor, within the combustor, between the combustor and the at least one turbine or within the at least one turbine.

Preferably the gas turbine engine also comprises a heat exchanger, the means to inject cooling liquid being arranged to inject cooling liquid between the at least one compressor and the heat exchanger, within the heat exchanger or between the at least one turbine and the heat exchanger.

Preferably the at least one compressor comprises a first compressor and a second compressor being arranged upstream of the first compressor, the at least one turbine comprises a first turbine and a second turbine arranged downstream of the first turbine, the first turbine being arranged to drive the first compressor and the second turbine being arranged to drive the second compressor.

The second turbine may be arranged to drive an output shaft. The second turbine may be arranged to drive the output shaft via a gearbox.

The at least one turbine comprises a third turbine arranged downstream of the second turbine. The third turbine may be arranged to drive an output shaft.

Alternatively the at least one compressor comprises a first compressor and the at least one turbine comprises a first turbine, the first turbine being arranged to drive the first compressor.

The at least one turbine comprises a second turbine arranged downstream of the first turbine. The second turbine may be arranged to drive the output shaft.

Alternatively the first turbine is arranged to drive an output shaft. The first turbine may be arranged to drive the output shaft via a gearbox.

Preferably the output shaft is arranged to drive an electrical generator.

The first compressor may be a centrifugal flow compressor or an axial flow compressor. The second compressor may be a centrifugal flow compressor or an axial flow compressor.

The first turbine may be a radial flow turbine or an axial flow turbine. The second turbine may be a radial flow turbine or an axial flow turbine.

The means to inject cooling liquid may be arranged to inject cooling liquid between the combustor and the first turbine, within the first turbine or between the first turbine and the heat exchanger.

The means to inject cooling liquid may be arranged to inject cooling liquid between the first turbine and the second turbine, within the second turbine or between the second turbine and the heat exchanger.

The means to inject cooling liquid may be arranged to inject cooling liquid between upstream of the first compressor, within the first compressor or between the first compressor and the heat exchanger.

The means to inject cooling liquid may be arranged to inject cooling liquid between the first compressor and the second compressor, within the second compressor or upstream of the second compressor.

The means to inject cooling liquid may be arranged to inject cooling liquid between the second turbine and the third turbine, within the third turbine or between the third turbine and the heat exchanger.

The cooling liquid may be water.

The present invention also provides a method of operating a gas turbine engine, the gas turbine engine comprising at least one compressor, a combustor and at least one turbine arranged in flow series, the at least one turbine being arranged to drive the at least one compressor, means to inject cooling liquid into the gas turbine engine, the means to inject cooling liquid being arranged to inject cooling liquid upstream of the at least one compressor, within the at least one compressor, within the combustor, between the combustor and the at least one turbine or within the at least one turbine, the method comprising injecting cooling liquid while the gas turbine engine is accelerating to provide a faster rate of acceleration.

Preferably the gas turbine engine comprises a heat exchanger, the means to inject cooling liquid being arranged to inject cooling liquid between the at least one compressor and the heat exchanger, within the heat exchanger or between the at least one turbine and the heart exchanger.

BRIEF DESCRIPTION OF THE DRAWINGS

The present invention will be more fully described by way of example with reference to the accompanying drawings in which.

DETAILED DESCRIPTION OF THE INVENTION

Figure 1:
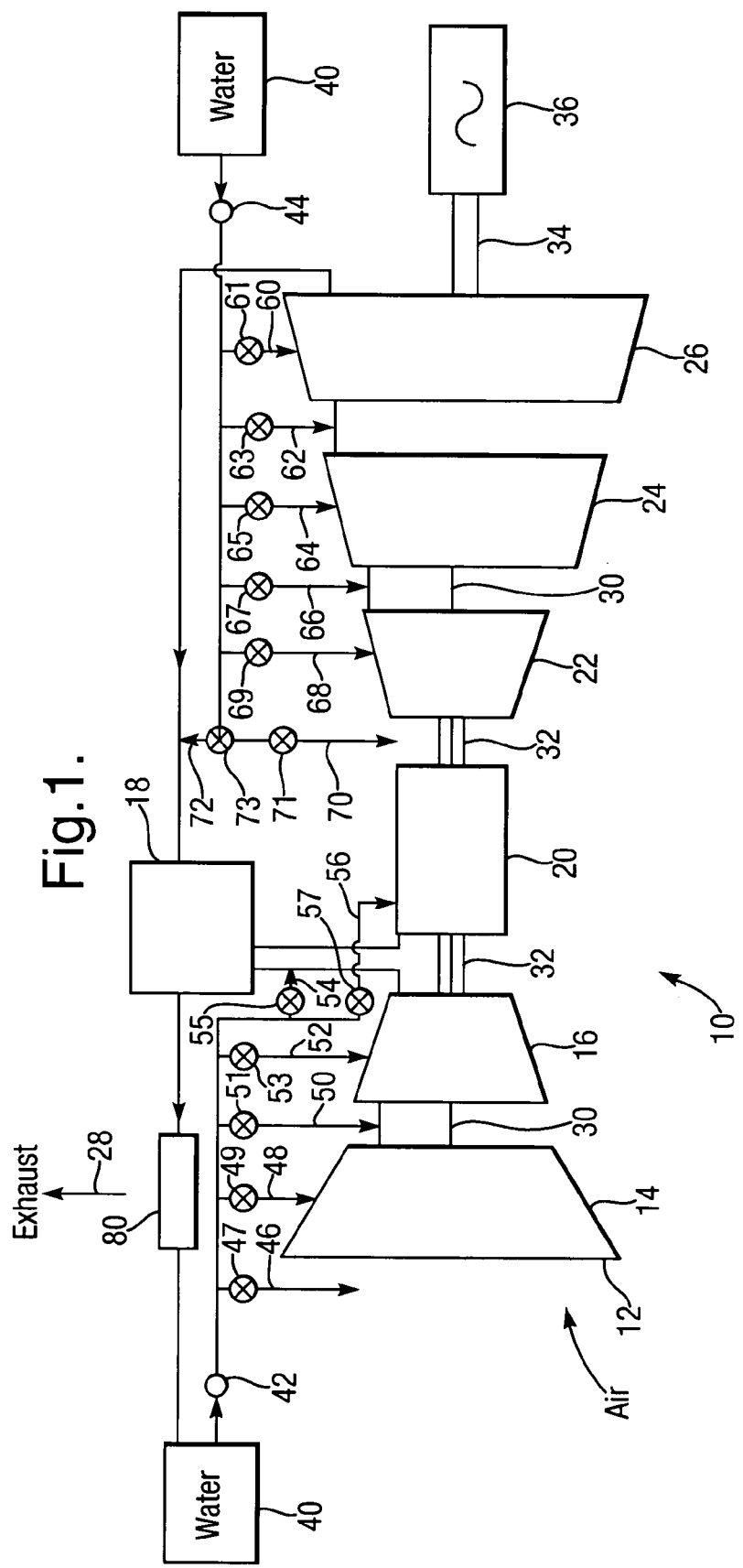
FIG. 1 is a schematic diagram of a gas turbine engine according to the present invention.

A gas turbine engine 10 according to the present invention, as shown in FIG. 1, comprises in flow series an inlet 12, a low pressure, second, axial flow compressor 14, a high pressure, first, axial flow compressor 16, a heat exchanger 18, a combustor 20, a high pressure, first, axial flow turbine 22, a low pressure, second, axial flow turbine 24, a power, third, axial flow turbine 26, the heat exchanger 18 and an exhaust 28. The second turbine 24 is arranged to drive the second compressor 14 via a shaft 30. The first turbine 22 is arranged to drive the first compressor 16 via a shaft 32. The third turbine 26 is arranged to drive an electrical generator 36 via an output shaft 34. Alternatively the output shaft 34 may be coupled to any other suitable load device (not shown), for example, the driving wheels of a motor vehicle or a propeller of a marine vessel.

A source of water 40 is provided to supply water to the gas turbine engine 10. The water is supplied to the gas turbine engine 10 by one or more pumps 42 and 44.

The pump 42 is arranged to supply water to the upstream end of the second compressor 14 via pipe 46 and valve 47. The pump 42 is arranged to supply water within the second compressor 14 via pipe 48 and valve 49. The pump 42 is arranged to supply water to a position between the second compressor 14 and the first compressor 16, e.g. downstream of the second compressor 14 and upstream of the first compressor 16, via pipe 50 and valve 51. The pump 42 is arranged to supply water within the first compressor 16 via pipe 52 and valve 53. The pump 42 is arranged to supply water to a position between the first compressor 16 and the heat exchanger 18 via pipe 54 and valve 55. The pump 42 is arranged to supply water to the combustor 20 via pipe 56 and valve 57.

The pump 44 is arranged to supply water within the third turbine 26 via pipe 60 and valve 61. The pump 44 is arranged to supply water to a position between the second turbine 24 and the third turbine 26, e.g. downstream of the second turbine 24 and upstream of the third turbine 26, via pipe 62 and valve 63. The pump 44 is arranged to supply water within the second turbine 24 via pipe 64 and valve 65. The pump 44 is arranged to supply water to a position between the first turbine 22 and the second turbine 24, e.g. downstream of the first turbine 22 and upstream of the second turbine 24, via pipe 66 and valve 67. The pump 44 is arranged to supply water within the first turbine 22 via pipe 68 and valve 69. The pump 44 is arranged to supply water to a position between the combustor 20 and the first turbine 22, e.g. downstream of the combustor 20 and upstream of the first turbine 22, via pipe 70 and valve 71. The pump 44 is arranged to supply water to a position between the third turbine 26 and the heat exchanger 18 via pipe 72 and valve 73.

A condenser 80 is provided downstream of the heat exchanger 18 to remove water from the exhaust gases 28 and the condenser 80 is arranged to supply the recovered water to the water tank 40.

The water is injected into the gas turbine engine 10 at the appropriate position by any suitable water injection apparatus. Additives may be provided in the water, for example methanol, to promote atomisation and/or evaporation by lowering surface tension and to prevent freezing of the stored water. Additives may be provided to extinguish fires.

The water injection apparatus is arranged to produce water droplets as small as possible so as to avoid erosion and to maximise surface area to maximise evaporation of the water. The water droplets have a droplet size of less than 20 $\mu$m, preferably less than 10 $\mu$m and more preferably less than 5 $\mu$m.

The water injection apparatus may be pressurised such that high-pressure water is swirled in a swirl chamber before being discharged. The water injection apparatus may be pressurised such that high-pressure water is discharged at high velocity and is atomised by collision on an impaction member. The water injection apparatus may be supplied with a stream of gas such that the low-pressure water is atomised before being discharged. The water injection apparatus may be supplied with a gas, which dissolves in the water such that the gas effervesces when the pressure is reduced when the water is discharged to cause the gas containing water droplets to explode into finer water droplets. The water injection apparatus may be pressurised, to about 100 bar, 10000 kPa, and heated such that the water droplets are atomised by boiling or flash atomisation.

In operation of the gas turbine engine 10 during changes in power levels water is injected into the gas turbine engine 10 to increase the acceleration, or deceleration, of the gas turbine engine 10.

During increases in power levels one or more of the valves 47, 49, 51, 53, 55 and 57 is opened to allow water to be injected into the gas turbine engine 10 upstream of the second axial flow compressor 14, within the second axial flow compressor 14, between the second axial flow compressor 14 and the first axial flow compressor 16, within the first axial flow compressor 16, between the first axial flow compressor 16 and the heat exchanger 18 and within the combustor 20 respectively. The valves 47, 49, 51, 53, 55 and 57 are controlled such that the water injection rate at the respective positions is controlled to maximise power, or thrust, boost, e.g. acceleration of the gas turbine engine 10, for example some of the valves 47, 49, 51, 53, 55 and 57 may be closed. The valves 47, 49, 51, 53, 55 and 57 are controlled to provide adequate surge margin in the first and second compressors 16 and 14 respectively and to take into account altitude, ambient temperature and flight Mach number etc. This is because the water increases the turbine power and therefore increases the acceleration rate beyond levels achievable without water injection due to limits on the compressor surge margin and the temperature.

The water may be injected upstream of the compressors, with the compressors, between the compressors, downstream of the compressor and upstream of the heat exchanger or within the combustor during the gas turbine engine starting cycle after light off, to provide a faster start than for a conventional gas turbine engine. This is because the water increases the turbine power and therefore increases the acceleration rate beyond levels achievable without water injection due to limits on the compressor surge margin and the temperature.

The water may be injected upstream of the compressors, within the compressors or between the compressors of an aero gas turbine engine during altitude restarting before light off, to increase the steady state windmill speed and allow a faster start than for a conventional gas turbine engine. This is because the cooling effect of the water reduces power absorption of the compressors.

During decreases in power levels one or more of the valves 61, 63, 65, 67, 69, 71 and 73 is opened to allow water to be injected into the gas turbine engine 10 within the third axial flow turbine 26, between the second axial flow turbine 24 and the third axial flow turbine 26, within the second axial flow turbine 24, between the second axial flow turbine 24 and the first axial flow turbine 22, within the first axial flow turbine 22, between the combustor 20 and the first axial flow turbine 22 and between the third axial flow turbine 26 and the heat exchanger 18 respectively. The valves 61, 63, 65, 67, 69, 71 and 73 are controlled such that the water injection rate at the respective positions is controlled to maximise power, or thrust, deceleration of the gas turbine engine 10, for example some of the valves 61, 63, 65, 67, 69, 71 and 73 may be closed. The levels of flow are varied depending upon operating conditions such as altitude, ambient temperature, flight Mach number etc.

The water may be injected upstream of the turbines, within the turbines, between the turbines or downstream of the turbines and upstream of the heat exchanger while the engine is decelerating to provide a greater rate of power reduction or thrust reduction than for a conventional gas turbine engine. This is because the temperature levels in the turbine are reduced, without infringing the compressor surge margin limits and combustor flame out. For a gas turbine engine with a heat exchanger the water injection counteracts the large heat input from the heat exchanger that cannot be turned off quickly.

Other fluids may be injected into the gas turbine engine upstream of the combustor 20, within the combustor 20, between the combustor 20 and the first axial flow turbine 22, within the first axial flow turbine 22, between the first axial flow turbine 22 and the second axial flow turbine 24, within the second axial flow turbine 24, between the second axial flow turbine 24 and the third axial flow turbine 26, within the third axial flow turbine 26 or between the third axial flow turbine 26 and the heat exchanger 18 in emergency conditions, such as shaft breakage, loss of load or emergency shut down. Special fire fighting liquids/chemicals may be injected. The injection rate of the fluid may be sufficiently large so as to promote compressor surge, which would further reduce power.

The amount of water injected may be varied transiently to minimise the thermal cycles experienced by the heat exchanger, depending on operating conditions such as ambient temperature.

The water may be heated prior to injection into the gas turbine engine. For example the engine exhaust may be used to heat the water or by passing the water through hollow compressor vanes, hollow compressor casings, hollow turbine vanes or hollow turbine casings or other heated hollow components.

The capacity of the first, high pressure, axial flow turbine may be sized larger than for a gas turbine engine without water injection to accommodate the water flow through the gas turbine engine. This increases the first, high pressure, axial flow compressor surge margin and hence the basic starting and acceleration performance, without the compromise to high power performance that a larger first, high pressure, turbine capacity would bring to a gas turbine engine without water injection.

Although the invention has been described with reference to a first axial flow compressor it may be equally possible to use a first centrifugal flow compressor. Similarly although the invention has been described with reference to a second axial flow compressor it may be equally possible to use a second centrifugal flow compressor. Although the invention has been described with reference to a first axial flow turbine it may be equally possible to use a first radial flow turbine. Although the invention has been described with reference to a second axial flow turbine it may be equally possible to use a second radial flow turbine.

Although the present invention has been described with reference to the injection of water into the gas turbine engine it may be possible to use other suitable liquids, which evaporate to cool the air or working fluid supplied to the gas turbine engine.

The present invention is applicable to non-aero gas turbine engines, for example industrial gas turbine engines or marine gas turbine engines, but it is also applicable to aero gas turbine engines for example turbofan, turbojet, turboprop or turboshaft gas turbine engines.

What is claimed is:

1. A method of operating a gas turbine engine, the gas turbine engine comprising at least one compressor, a combustor and at least one turbine arranged in flow series, the at least one turbine being arranged to drive the at least one compressor, means to inject cooling liquid into the gas turbine engine, the means to inject cooling liquid being arranged to inject cooling liquid upstream of the at least one compressor, within the at least one compressor, within the combustor, between the combustor and the at least one turbine or within the at least one turbine, the method comprising injecting cooling liquid while the gas turbine engine is accelerating to provide a faster rate of acceleration and also comprising injecting cooling liquid at one of between the combustor and the at least one turbine and within the at least one turbine to provide a faster rate of deceleration.

2. A method as claimed in claim 1 wherein the gas turbine engine comprises a heat exchanger, the means to inject cooling liquid being arranged to inject cooling liquid between the at least one compressor and the heat exchanger, within the heat exchanger or between the at least one turbine and the heat exchanger.

3. A method as claimed in claim 1 comprising injecting cooling liquid upstream of the at least one compressor, within the at least one compressor or within the combustor to provide a faster rate of acceleration.

4. A method as claimed in claim 3 comprising injecting cooling liquid during the gas turbine engine starting cycle, after light off.

5. A method as claimed in claim 3 comprising injecting cooling liquid during the gas turbine engine starting cycle, before light off.

6. A method as claimed in claim 2 comprising injecting cooling liquid upstream of the at least one compressor within the at least one compressor and at one of between the at least one compressor and the heat exchanger and within the combustor to provide a faster rate of acceleration.

7. A method of operating a gas turbine engine, the gas turbine engine comprising at least one compressor, a combustor and at least one turbine arranged in flow series, the at least one turbine being arranged to drive the at least one compressor, means to inject cooling liquid into the gas turbine engine, the means to inject cooling liquid being arranged to inject cooling liquid upstream of the at least one compressor, within the at least one compressor, within the combustor, between the combustor and at one of the at least one turbine and within the at least one turbine, the method comprising injecting cooling liquid while the gas turbine engine is accelerating to provide a faster rate of acceleration and wherein the gas turbine engine comprises a heat exchanger, the means to inject cooling liquid being arranged to inject cooling liquid at one of between the at least one compressor and the heat exchanger, within the heat exchanger and between the at least one turbine and the heat exchanger and further comprising injecting cooling liquid at one of between the combustor and the at least one turbine within the at least one turbine and between the at least one turbine and the heat exchanger to provide a faster rate of deceleration.

8. A method as claimed in claim 1 wherein the at least one compressor comprises a first compressor and a second compressor being arranged upstream of the first compressor, the at least one turbine comprises a first turbine and a second turbine arranged downstream of the first turbine, the first turbine being arranged to drive the first compressor and the second turbine being arranged to drive the second compressor, the method comprising injecting cooling liquid between the combustor and the first turbine, within the first turbine and at one of between the first turbine and the second turbine and within the second turbine to provide a faster rate of deceleration.

9. A method as claimed in claim 7 wherein the at least one compressor comprises a first compressor and a second compressor being arranged upstream of the first compressor, the at least one turbine comprises a first turbine and a second turbine arranged downstream of the first turbine, the first turbine being arranged to drive the first compressor and the second turbine being arranged to drive the second compressor, the method comprising injecting cooling liquid between the combustor and the first turbine, within the first turbine, between the first turbine and the second turbine and at one of within the second turbine and between the second turbine and the heat exchanger to provide a faster rate of deceleration.

10. A method as claimed in claim 9 wherein the at least one turbine comprises a third turbine arranged downstream of the second turbine, the method comprising injecting cooling liquid between the second turbine and the third turbine and at one of within the third turbine and between the third turbine and the heat exchanger to provide a faster rate of deceleration.

11. A method as claimed in claim 8 wherein the at least one turbine comprises a third turbine arranged downstream of the second turbine, the method comprising injecting cooling liquid at one of between the second turbine and the third turbine and within the third turbine to provide a faster rate of deceleration.

12. A method as claimed in claim 1 or 7 wherein the method comprises injecting cooling water.

\* \* \* \* \*